United States Patent
Kodama

[11] 4,241,621
[45] Dec. 30, 1980

[54] TRANSMISSION APPARATUS FOR MOTOR VEHICLE

[75] Inventor: Masayuki Kodama, Tokyo, Japan

[73] Assignee: Fuji Jukogyo Kabushiki Kaisha, Tokyo, Japan

[21] Appl. No.: 918,464

[22] Filed: Jun. 23, 1978

[51] Int. Cl.³ .................................................. F16H 37/8
[52] U.S. Cl. ..................................... 74/700; 180/247; 74/665 T
[58] Field of Search ............ 74/700, 701, 745, 665 F, 74/665 G, 665 H, 665 S, 665 T; 180/44, 45–47, 49, 50

[56] References Cited

U.S. PATENT DOCUMENTS

| | | | |
|---|---|---|---|
| 2,314,833 | 3/1943 | Keese | 180/49 X |
| 2,357,781 | 9/1944 | Randol | 74/665 T X |
| 2,674,136 | 4/1954 | Bryan | 74/665 T |
| 2,714,936 | 8/1955 | Gregory | 180/49 X |
| 2,796,942 | 6/1957 | Hill | 74/700 UX |
| 2,796,943 | 6/1957 | Rolt et al. | 74/700 UX |
| 2,971,595 | 2/1961 | Faberé et al. | 74/665 T X |

Primary Examiner—Roy D. Frazier
Assistant Examiner—Peter A. Aschenbrenner
Attorney, Agent, or Firm—Martin A. Farber

[57] ABSTRACT

A transmission apparatus for motor vehicle in which the engine is positioned in front side of the front axle, a sub-transmission is provided in the space formed above the front axle, a main transmission is adapted to transmit the output of the sub-transmission to the front wheels and to the rear wheels through means for transmitting the output, and the means for transmitting the output includes a clutch means for selectively connecting the transmission to the rear axle.

2 Claims, 12 Drawing Figures

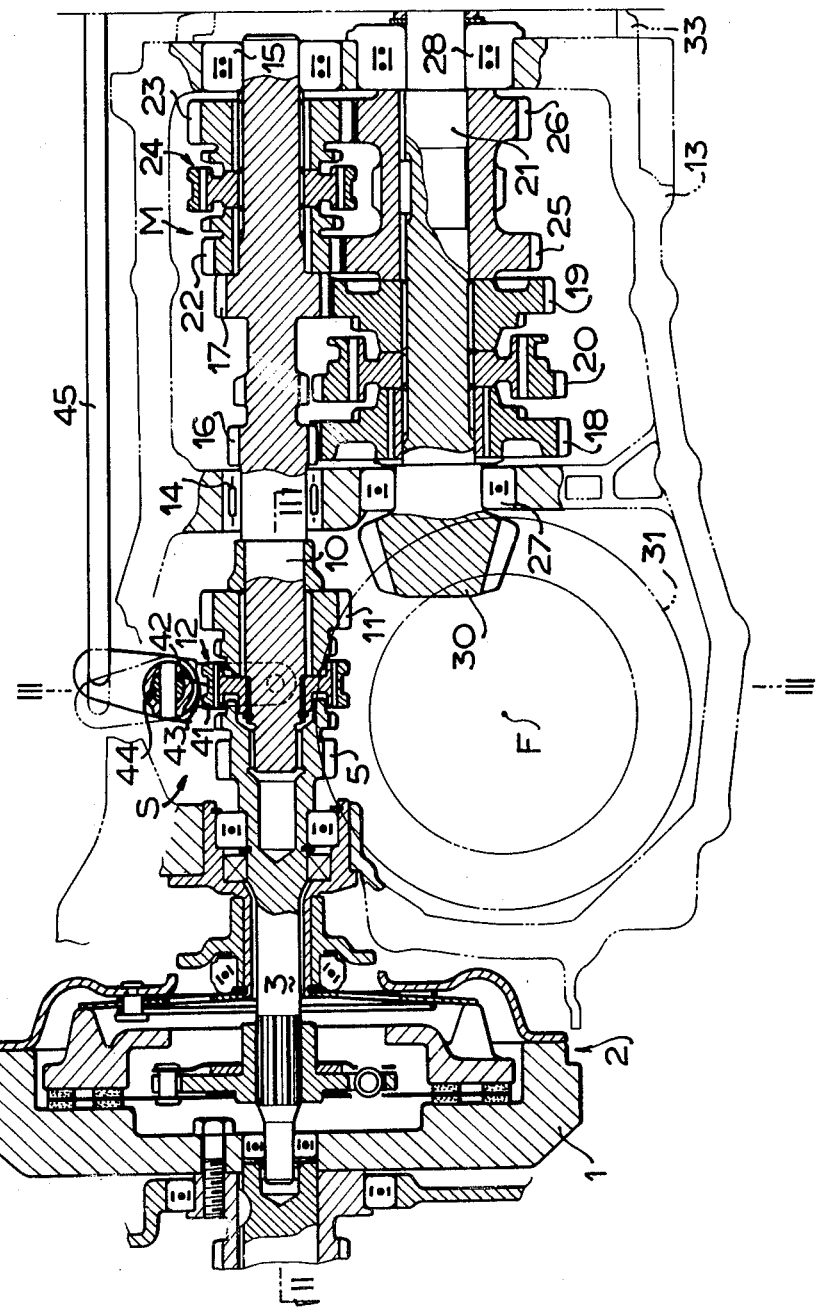

TRANSMISSION APPARATUS FOR MOTOR VEHICLE

BACKGROUND OF THE INVENTION

The present invention relates to a transmission apparatus for motor vehicle in which the engine is longitudinally mounted in the front position of the vehicle and output of the engine is transmitted to the front and selectively to the rear axle of the vehicle through the transmission. More particularly the present invention relates to a transmission apparatus which transmits the power of the engine both to the front axle and to four wheels of front and rear.

In recent years, the four-wheel driving passenger car has been preferably and widely used, because it has high steering stability. It is desirable that such a car can be economically driven at a high speed on the highway for example with a boat-trailer, camping trailer and the like, and on the other hand, can be powerfully driven on mountain path, on the sands, and the like.

Typical means for meeting such a requirement is to increase the changing speed stage of the transmission in number of the stage. However, this means results in complexity of manipulation for changing the speed of the transmission, thereby to decrease its practicability. In order to remove such disadvantages, it has been proposed to provide a sub-transmission together with the main transmission of which sub-transmission may be manipulated to change the transmission speed independent of the main transmission. If there is provided with a main transmission having four-speed-stage and a sub-transmission having two-speed-stage, the transmission having eight-speed-stage may be obtained. Namely, when the sub-transmission is set in the lower speed stage, the main transmission can transmit four speeds in the lower speed range, and when the sub-transmission is set in the higher speed stage, four speed in the higher speed range can be transmitted through the main transmission. In accordance with this sub-transmission apparatus, the manipulation is simply performed, because the main transmission may be manipulated in four stages. However, it is necessary to provide a special space in the transmission housing for the sub-transmission, which results in increase of the transmission in dimensions. Especially, since the above-mentioned transmission apparatus which can be manipulated to convert into four-wheel driving transmission is provided with clutch means for transmitting the power of the engine to the sub-drive wheels, the apparatus inherently has a long length. Therefore, such an apparatus is further increased in length by the sub-transmission.

In such a vehicle in which the engine is longitudinally mounted in the front position thereof, the engine must be extended forward from the front wheels more than conventional car because of the long size transmission or the transmission must be positioned rearward whereby the space for the driver in the vehicle is reduced. If the length from the front wheels to the front end of the car becomes long, it will become difficult to manipulate the steering wheel of the car.

Further, in the case that the sub-transmission is provided to transmit the output of the main transmission, the sub-transmission must be designed to have great dimensional size. If the inertia lock type synchromesh mechanism is employed in such a sub-transmission, inertia mass of the synchronized members in the mechanism will be great value, which makes the manipulation of the sub-transmission heavy.

Therefore, it is the object of the present invention to provide a transmission apparatus which need not a special space for the sub-transmission in the transmission housing, which may be manufactured in small size, and of which sub-transmission may be easily manipulated.

SUMMARY OF THE INVENTION

In accordance with the present invention, the engine is positioned in front side of the front axle, a sub-transmission is provided in the space formed above the front axle, a main transmission is adapted to transmit the output of the sub-transmission to the front wheels and to the rear wheels through means for transmitting the output, and the means for transmitting the output includes a clutch means for selectively connecting the transmission to the rear axle.

These and other advantages of the invention will be more clearly understood from the following description taken together with the accompanying drawings.

BRIEF DESCRIPTION OF THE DRAWINGS

In the drawings:

FIG. 1a is a sectional view showing a left half of an embodiment of the present invention, FIGS. 7a to 7c are illustrations for showing the operation of manipulating device of another embodiment.

DESCRIPTION OF THE PREFERRED EMBODIMENTS

Figure 2:
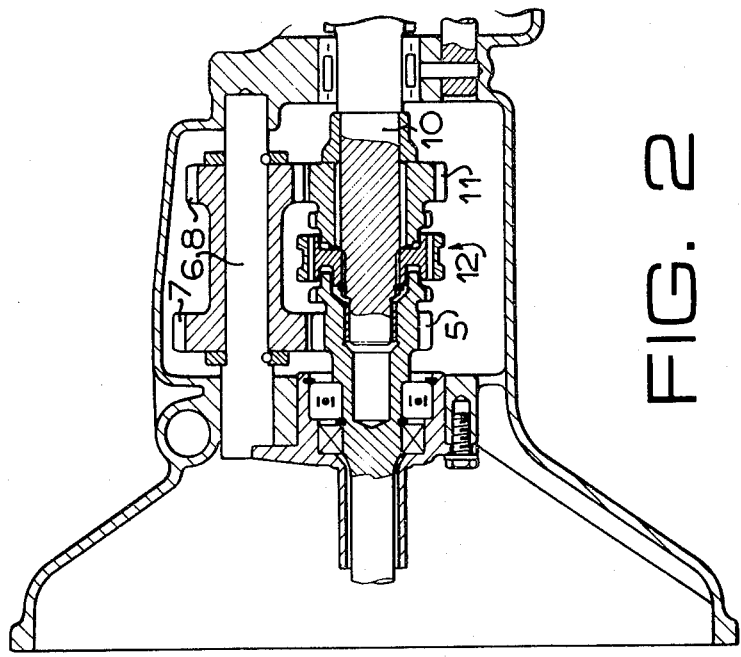
FIG. 2 is a sectional view taken along the line II—II in FIG. 1a, FIG. 3 is a sectional view taken along the line III—III in FIG. 1a, FIG. 4 is a sectional view taken along the line IV—IV in FIG. 1b.

Referring to the drawings, numeral 1 designates a flywheel secured to the end of crankshaft of the engine which is longitudinally disposed in the front portion of car. A first main drive shaft 3 in alignment with the crankshaft is rotatably supported and a clutch device 2 is provided on the first main drive shaft to engage with the flywheel 1. A 2-speed sub-transmission S is positioned above the front axle F and provided to transmit the power of the engine to a second main drive shaft 10. The sub-transmission S comprises a gear 5 formed on the first main drive shaft 3, counter gears 7 and 8 rotatably mounted on a counter shaft 6, a gear 11 rotatably mounted on the second main drive shaft 10, and an inertia lock type synchromesh mechanism 12 mounted on the second main drive shaft 10 with the spline. The gears 5 and 11 mesh with the gears 7 and 8 respectively.

The second main drive shaft 10 is in alignment with the first main drive shaft 3 and extended into a transmission case 13 of a 4-speed main transmission M and rotatably supported by bearings 14 and 15. The main transmission M comprises a lower 2-speed transmission device and a higher 2-speed transmission device. The lower 2-speed transmission device comprises gears 16 and 17 formed on the second main drive shaft 10, gears 18 and 19 rotatably mounted on a third main drive shaft 21 and engaged with the gears 16 and 17 respectively, and a lower speed stage synchromesh mechanism 20 splined on the shaft 21 between the gears 18 and 19. The higher 2-speed transmission device comprises gears 22 and 23 rotatably mounted on the second main drive shaft 10, a higher speed stage synchromesh mechanism 24 splined on the shaft 10 between the gears 22 and 23, gears 25 and 26 keyed on the third main drive shaft 21 and engaged with the gears 22 and 23 respectively. It should be noted that the back gear mechanism is not shown in the drawings.

The third main drive shaft 21 is rotatably supported by bearings 27 and 28 and provided with a hypoid pinion 30 formed at the front end thereof. The hypoid pinion 30 meshes with a ring gear 31 of a final reduction gear device mechanism. The final reduction gear device is positioned beneath the sub-transmission S in the space between the clutch device 2 and the main transmission M, and adapted to transmit the output of the third main drive shaft 21 to the front wheel through the front axle F. The rear end of the third main drive shaft 21 extends out of the transmission case 13, on which a gear 37 is fixed with a spline engagement.

On the rear end of the transmission case 13 is provided a housing 33 in which a rear wheel drive shaft 34 is rotatably supported by bearings 35 and 36. On the rear wheel drive shaft 34 is rotatably mounted a gear 38 which engages the gear 37. A rear wheel drive synchromesh mechanism 40 is mounted on the rear wheel drive shaft with spline. The rear wheel drive shaft 34 is connected to a rear axle through a propeller shaft (not shown).

Figure 5:
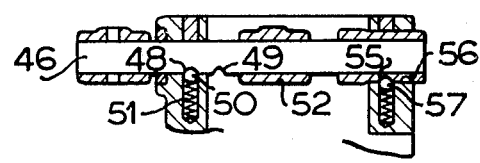
FIG. 5 is a sectional view taken along the line V—V in FIG. 4, FIGS. 6a to 6c are illustrations for showing the operation of manipulating device.

Device for manipulating the clutch means in the sub-transmission S and for coupling the third main drive shaft 21 to the rear wheel drive shaft 34 will be described hereinafter. A shift fork 43 is rotatably supported by a shaft 44, and opposite ends of the fork are slidably engaged with a circumferential groove 42 of a sleeve 41 which is a part of the synchromesh mechanism 12 as well known mechanism. The lever of the shift fork 43 is pivotally connected to a link 45 of which rear end is connected to a shift rod 46 through a connecting member 47. The shift rod 46 is slidably supported in the housing 33, and provided with a pair of notches 48 and 49 as shown in FIG. 5. With one of the notches, a lock ball 50 is engaged by means of a spring 51 so that the shift rod 46 may be locked at the notches 48 or 49. On the shift rod 46, an arm 52 is fixedly provided by means of a pin 53 and a shift fork 54 is slidably mounted at base portion 54a thereof. The shift fork 54 engages a circumferential groove 59 of a sleeve 58 of the synchromesh mechanism 40 so as to shift the sleeve along the shaft 34. The base portion 54a is provided with a pair of notches 55 and 56 and a spring loaded lock ball 57 engages with one of the notches to lock the shift fork at the notch 55 or 56.

An actuating rod 60 is slidably supported in the housing 33 at a position adjacent and parallel to the shift rod 46, the arm 52 and shift fork 54 being slidably mounted thereon. The actuating rod 60 is provided with a snap ring 61 (FIG. 6) and notches 62 and 63. On the guide plate 64 secured to the housing 33, a pair of notches 65 and 66 are provided opposite the notches 62 and 63. In the arm 52 and the fork 54 are provided holes 67 and 68 which correspond to the notches 62 and 63 respectively. The holes 67 and 68 receive slidable pins 70 and 71 each of which has a length sufficient to engage corresponding one notch. On the rear end of the actuating rod 60 is connected a shift lever 72 which is pivoted by a pin 73 on the bracket 75 secured to the housing 33.

Figure 1B:
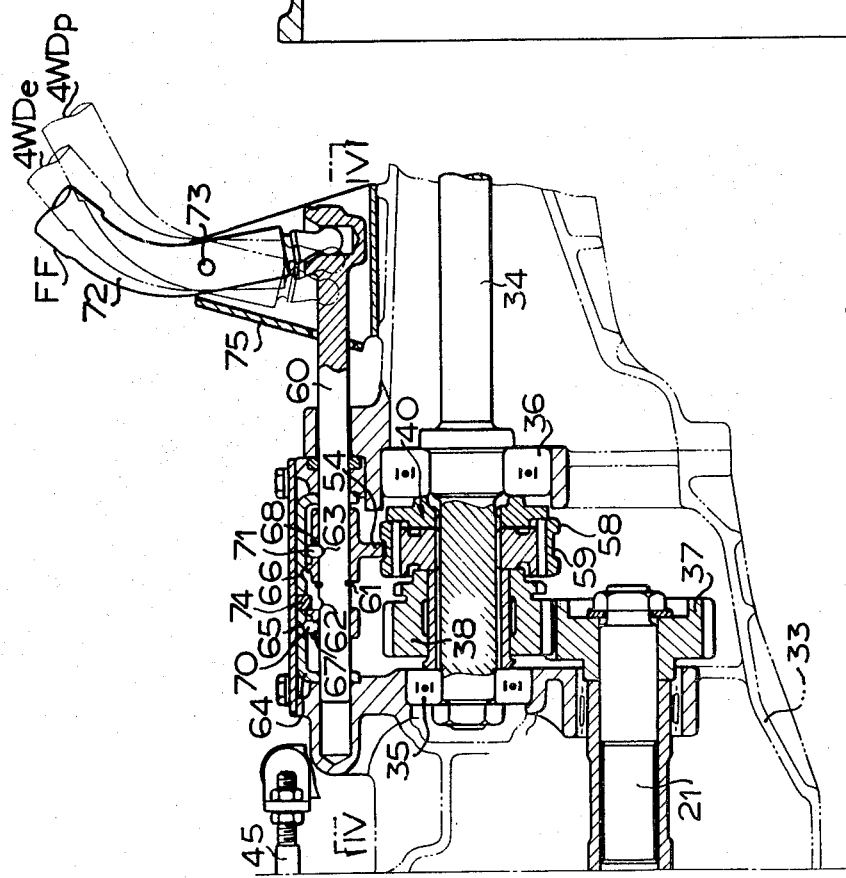
FIG. 1b is a sectional view showing a right half of the embodiment.
Figure 3:
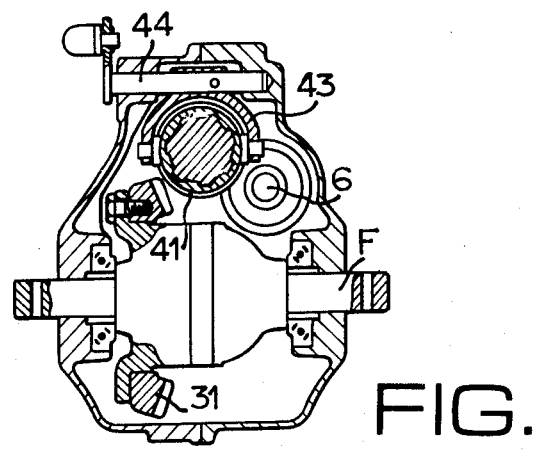
Figure 4:
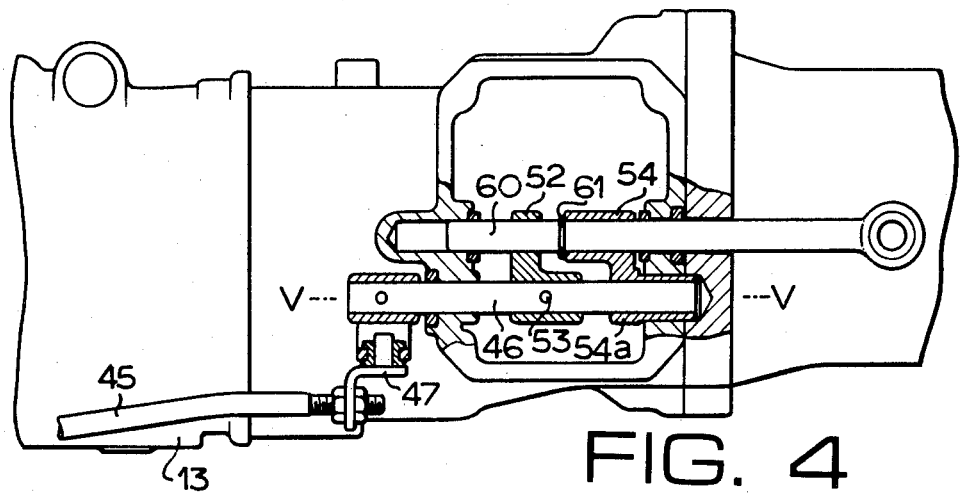

FIG. 6a shows front wheel driving position of the shifting mechanism comprising the shift rod 46, arm 52, shift fork 54 and actuating rod 60, where the shift lever 72 is in the front wheel driving position FF in FIG. 1b. The actuating rod 60 is in the right extreme end position, whereby the shift fork 54 is located in the right position by the snap ring 61, where the pin 71 engages the notch 63 of the actuating rod 60 and the lock ball 57 engages the notch 55 of the shift fork 54. In this position, the sleeve 58 of the synchromesh mechanism 40 is in the right position, so that the clutch device of the mechanism does not engage the gear 38. The arm 52 and shift rod 46 are also in the right position, in which the arm abuts on the stopper 74 projected from the guide plate 64 and the lock ball 50 engages the notch 48.

In this position, the link 45 is in the right position, so that the shift fork 43 is actuated to shift the sleeve 41 of the synchromesh 12 of the sub-transmission S in the left direction to couple the clutch device between the gear 5 and the synchromesh 12.

Thus, power of the engine is transmitted through the clutch device 2, first main drive shaft 3, gear 5 and sleeve 41 of synchromesh mechanism 12 to the second main drive shaft 10 without reduction by the sub-transmission S. The main transmission M transmits the rotation of second main drive shaft 10 to the third main drive shaft 21 by means of 4-speed transmission gear means. More particularly, if the synchromesh mechanism 20 is actuated by manipulating a shift lever (not shown) to couple the clutch device between the synchromesh mechanism and the gear 18, the third main drive shaft 21 is rotated at the lowest first speed. If the clutch device between the synchromesh mechanism and the gear 19 is engaged, the drive shaft 21 rotates at second speed. Further, engagement of the clutch device between the synchromesh mechanism 24 and the gear 22 will produce the third speed of the drive shaft 21, and engagement of the clutch device between the synchromesh mechanism and the gear 23 causes the fourth speed rotation of the drive shaft 21. The output of the drive shaft 21 is transmitted to the front axle through the gears 30 and 31 to drive the front wheel. On the other hand, since the synchromesh mechanism 40 is not in engagement position with the gear 38, the rear wheel is not driven. Thus, only front wheel is driven in the higher speed range without reduction of the sub-transmission S.

When the shift lever 72 is moved to the economical four-wheel driving position (4WDe) in FIG. 1b, the actuating rod 60 is shifted in the left direction up to the intermediate position. Since the pin 71 engages the notch 63 of the actuating rod 60, the shift fork 54 is also shifted in the left direction together with the rod 60. When the shift fork 54 reaches the position of FIG. 6b, the fork is stopped by the stopper 74, where the pin 71 positions opposite the notch 66 of the guide plate 64 and the lock ball 57 engages the notch 56, resulting in the locking of the fork 54. Thus, only the shift fork 54 is moved, so that the sleeve 58 of the synchromesh mechanism 40 is shifted in the left direction to engage the gear 38. Accordingly, the shaft 34 is rotated through the third main drive shaft 21, gears 37 and 38 and sleeve 58. Since the shift rod 46 is not moved, the sub-transmission S is in the higher speed coupling state. Thus, the front and rear wheels are driven at higher speed range without reduction of the sub-transmission S.

When the shift lever 72 is moved to the powerful four-wheel driving position (4WDp), the actuating rod 60 is shifted to the left extreme end position. In this operation, the fork 54 stays in the described position, the pin 71 is moved by the slant of the notch 63 to engage the notch 66. The arm 52 is moved by the snap ring 61 whereby the pin 70 is shifted by slant of the notch 65, resulting in removing from the notch 65 and engaging the notch 62 as shown in FIG. 6c. Thus, the shift rod 46 is moved together with the arm 52 and locked by engagement of the lock ball 50 with the notch 49 at the left end position. The movement of the shift rod 46 causes counter-clockwise rotation of the shift fork 43 through the link 45 thereby to move the sleeve 41 of the synchromesh mechanism 12 to bring about the engagement between the synchromesh mechanism and the gear 11. Therefore, the rotation of the first main drive shaft 3 is transmitted to the second main drive shaft 10 with the reduction by the gears 5, 7, 8 and 11. Thus, the front and rear wheels are driven at the lower speed range.

Figures 6, 7:
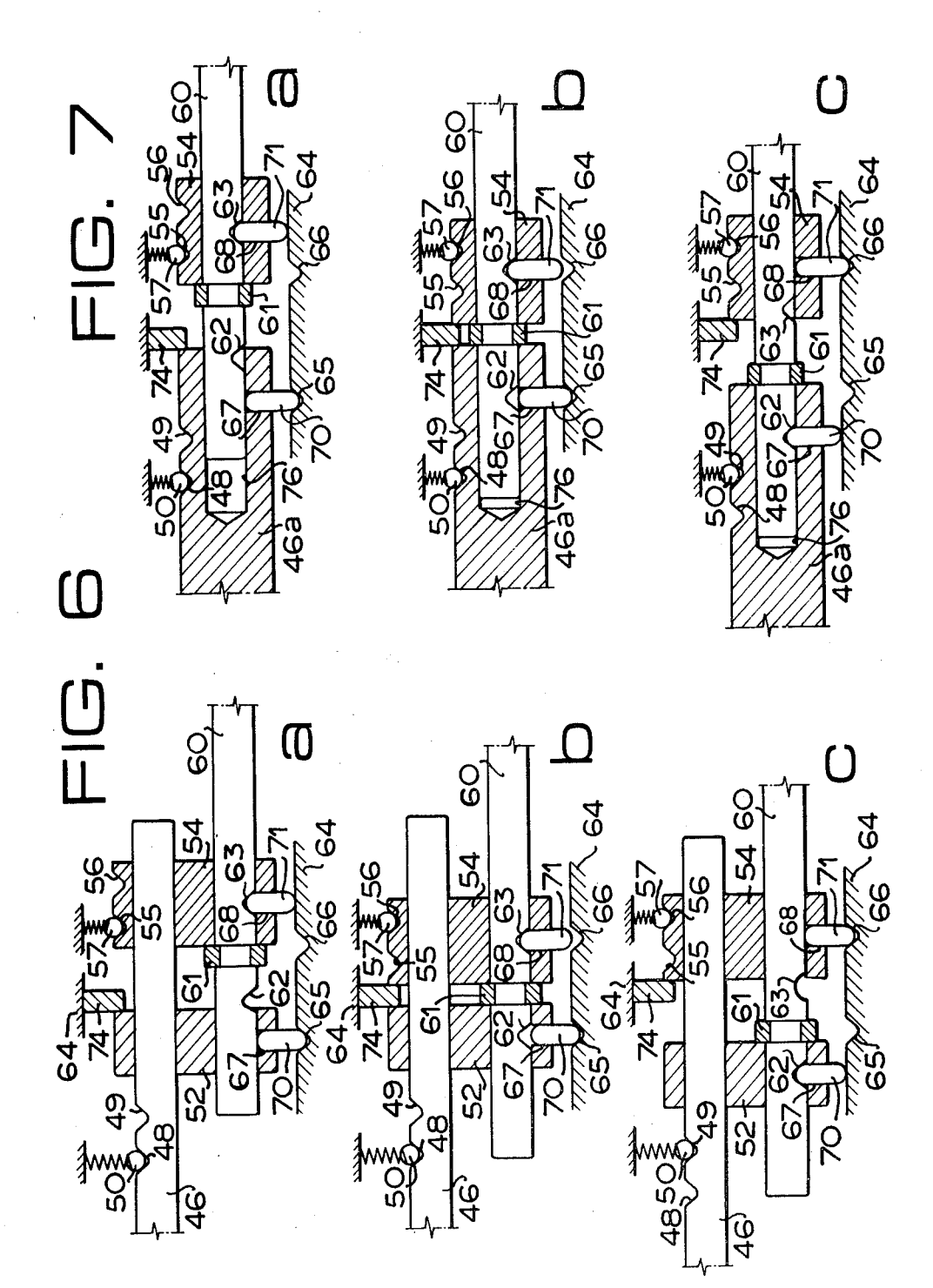

In the embodiment of FIG. 7, the arm 52 and the shift rod 46 in the above mentioned embodiment are constructed into one shift rod 46a and the arm being omitted. The shift rod 46a is aligned with the actuating rod 60 which is slidably engaged with an axial hole 76 of the shift rod. The other parts are same as the prior embodiment in construction and operation and therefore, designated by same numerals as prior one. Operation of this embodiment will be easily understood from FIGS. 7a to 7c which are corresponding to FIGS. 6a to 6c.

From the foregoing, it will be understood that the present invention may provide a transmission apparatus in which the engine is mounted in front side of the front axle and the sub-transmission is provided in the space formed necessarily above the front axle, whereby, since a special space for the sub-transmission is not provided, the apparatus may be manufactured in small size. Further, it is possible to drive the four-wheel drive car in the economical higher speed range and in the powerful lower speed range whereby performance of the engine may be sufficiently used under various driving conditions.

What is claimed is:

1. A transmission apparatus for a motor vehicle in which an engine having a crankshaft is longitudinally disposed in front of the front axle of the vehicle comprising a transmission case,
a clutch device coaxially coupled to the crankshaft of the engine,
a first main drive shaft coaxially connected to said clutch device at a right angle to the front axle, an output end of said first main drive shaft being inserted into said transmission case,
a second main drive shaft disposed in said transmission case coaxially to said first main drive shaft,
a sub-transmission means disposed substantially directly above said front axle and for transmitting the output of said first main drive shaft to said second main drive shaft,
said sub-transmission means is disposed in said transmission case substantially directly above said front axle and for transmitting the output of said first main drive shaft to said second main drive shaft,
said sub-transmission means having a 2-speed gear ratio including means having counter gears for reducing the rotational speed of said second main drive shaft relative to said first main drive shaft, and a sub-transmission synchromesh means for selectively coupling the output end of said first main drive shaft and an output end of said sub-transmission means to said second main drive shaft,
a third main drive shaft disposed in said transmission case in parallel with said second main drive shaft,
a main transmission disposed on both of said second and third main drive shafts, said sub-transmission means thereby being operatively disposed in the input side of said main transmission, said main transmission comprising main transmission means including a plurality of reduction gear trains having at least a 3-speed reduction gear ratio in a whole reduction range necessary to drive the vehicle and main transmission synchromesh means for selective operative engagement of said main transmission synchromesh means with said reduction gears so as to transmit an output of said second main drive shaft to said third main drive shaft into several selective rotational speeds, respectively,
a hypoid pinion mounted on an end of said third main drive shaft,
a final reduction gear operatively connected to said front axle and meshed with said hypoid pinion, said final reduction gear being positioned in said transmission case substantially directly beneath said sub-transmission means,
clutch means for providing four wheel for selectively transmitting the output of said third main drive shaft to the rear axle of the motor vehicle,
means for manipulating said clutch means, and
means for manipulating said sub-transmission means, whereby the vehicle may be driven selectively in a lower speed range and in a higher speed range, respectively.

2. Transmission apparatus in a motor vehicle having a frong axle and a rear axle, comprising an engine,
a first clutch housing, said clutch device is disposed in said clutch housing,
a main transmission housing,
a 2-speed sub-transmission operatively connected to said clutch device, and a main transmission operatively connected to said sub-transmission and disposed in said main transmission housing,
a final reduction gear connected to the front axle and to said main transmission,
a final reduction gear housing, said sub-transmission and said final reduction gear directly therebelow with the front axle are disposed in said final reduction gear housing,
a second clutch housing,
clutch means for providing four wheel drive for selectively connecting said rear axle with said main transmission, said clutch means being disposed in said second clutch housing,
the engine and said first clutch housing, said final reduction gear housing, said main transmission housing and said second clutch housing are disposed substantially horizontally one behind the other.

* * * * *